Figure 4:
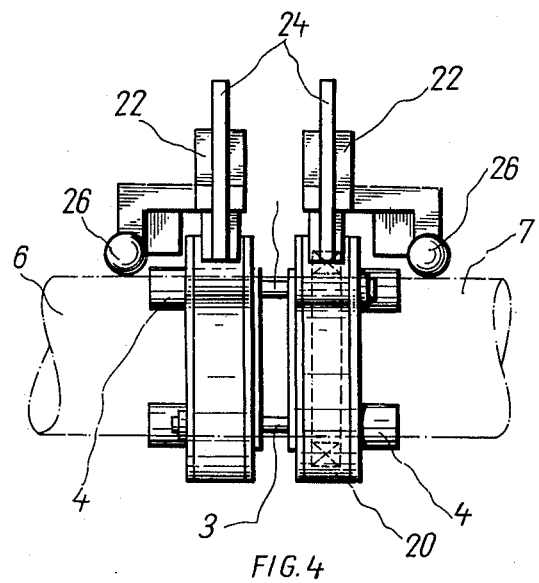

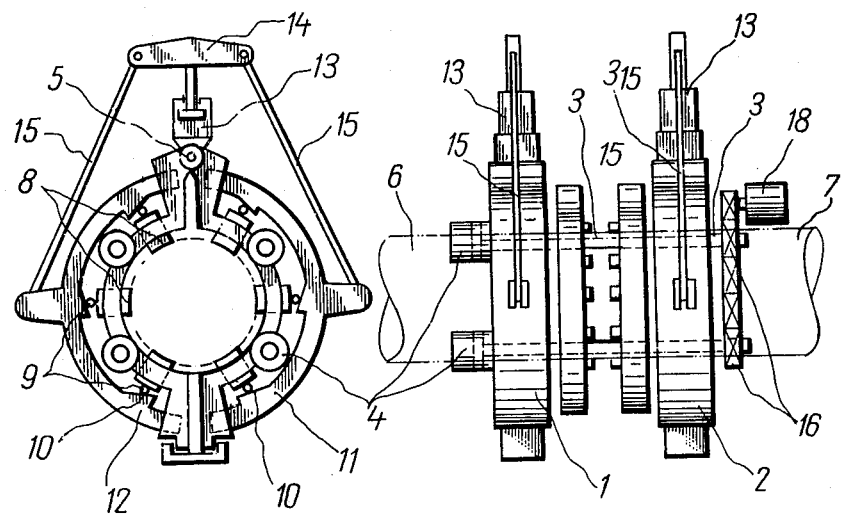
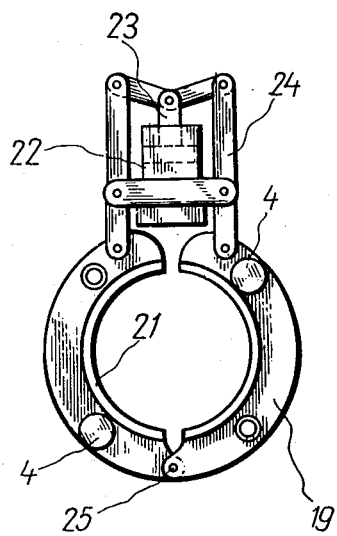
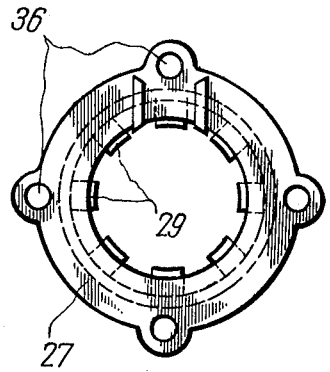

United States Patent Office 3,166,664
Patented Jan. 19, 1965

3,166,664
WELDING HEAD FOR ELECTRICAL RESISTANCE WELDING OF CIRCULAR TUBE JOINTS
Boris Evguenievich Paton, Vladimir Konstantinovich Lebedev, Nickolai Gerasimovich Ostapenko, Rafail Ivanovich Lashkevich, Platon Ivanovich Sevbo, Vasily Alexeevich Sakharnov, Mark Davydovich Litvinchuk, and Grigory Vasilievich Gorbunov, all of Kiev, U.S.S.R., assignors to Institute Elektrosvaiki imeni Patona EO, Kiev, U.S.S.R.
Filed Mar. 20, 1962, Ser. No. 181,087
4 Claims. (Cl. 219—101)

The present invention relates to a welding head for electrical resistance welding of circular tube joints.

More particularly this invention relates to welding heads used for electrical resistance welding of circular joints of tubes having, in the majority of cases, large diameters.

The known welding heads comprising an annular body of two parts, movable with respect to each other; an annular welding converter; clamping and contact shoes for clamping the tubes under work and supplying welding current to them; a drive for displacement of the clamping shoes; and a drive for the travel of the welding head body parts in axial direction and having a complicated arrangement of the clamping devices, are not sufficiently compact, do not provide favourable conditions for changing the operational duty of welding within wide limits, do not ensure a sufficient rigidity of the body and do not provide the desired convenience during the process of welding.

To eliminate the above mentioned shortcomings it has been proposed to provide the drive, serving for displacement of the clamping shoes in radial direction, with movable cam members having on their inner side bevelled cam surface interacting through bearing rollers with the clamping shoes and displacing the same when the position of the cam members is changed due to the action of a hydraulic cylinder, the piston rod of which is linked with a cross-arm connected by means of a traction rod with the above mentioned cam members.

The drive for moving the body portions in axial direction comprises an electrically driven lead screw for movement at low speeds during welding, and, also, a hydraulic cylinder for high-speed displacement when forcing the joint edges together to complete the weld.

To impart increased stability to the welded tube edges it is proposed to provide the split welding head annular body with rigid solid clamping bushings actuated from a vertical hydraulic cylinder, the piston rod of which, through two lever systems, is linked to the upper ends of the openable halves of the bushings hingedly connected at their lower ends.

For facilitating the welding head travel from one joint to another the head body is provided in a modification with bearing rolls, which roll along the tube to be welded. An unopenable body is used to increase the rigidity of the welding head body and to ensure the possibility of welding tubes with a small wall thickness, the drive for displacement of the clamping shoes and that for axial transposition of the tubes being welded comprising annular hydraulic cylinders with annular pistons and piston rods, which embrace the tube under work.

A suspended welding head with an openable body is represented in FIGS. 1 and 2 in two views. FIGURES 3 and 4 illustrate in two views a modified version of the openable-body welding head in which rigid solid clamping bushings actuated by a vertical hydraulic cylinder are used and the welding head body is fitted with bearing rolls for travel along the tube under work.

Figure 6:
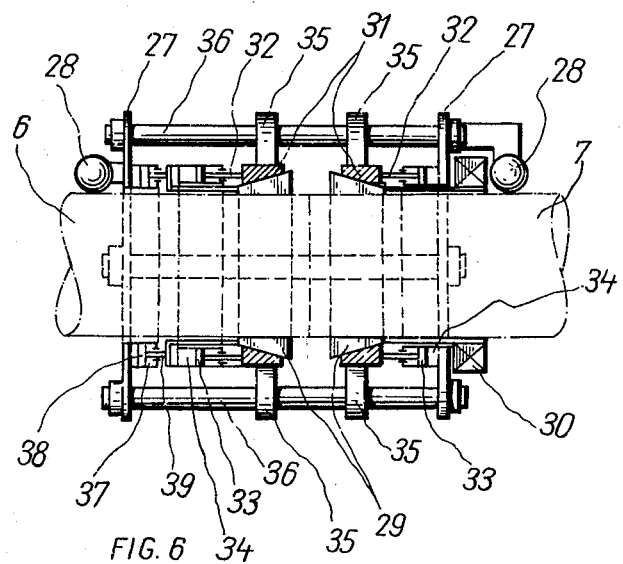

FIGS. 5 and 6 show in two views a welding head modification with an unopenable annular body and annular hydraulic cylinders for operating the clamping shoes and for axial displacement of the two welding head halves.

The welding head (FIGS. 1 and 2) comprises a pair of spaced portions, annular body 1 and 2, which are interconnected through rods 3 of the horizontal hydraulic cylinders 4. The welding head body portions open in a diametrical plane due to the provision of two hinges 5.

Tubes 6 and 7 to be welded are held secured in the two body portions 1 and 2 with the aid of radially movable clamping shoes 8 which engage rolls 9 which in turn engage cam surfaces 10 provided on the inner side of the movable halfrings 11 and 12. Hydraulical cylinders 13 accomplish, through cross-bars 14 and traction rods 15, displacement of movable halfrings 11 and 12 when clamping and releasing the tubes under work.

In order to move the opposed ends of the tubes 6 and 7 together to establish the electrical welding circuit, the rods 3 threadedly received nuts 16 having intermeshing gear teeth thereon and a motor 18 is provided with a drive pinion meshing with the gear teeth on one of the nuts 16 to simultaneously drive all of the nuts 16 and move the body portions 1 and 2 and the tubes 6 and 7 toward each other. The hydraulic cylinders 4 actuate rods 3 to move the body portions 1 and 2 toward each other and thereby apply abutting pressure to the opposed ends of the tubes 1 and 2 to complete the welding operation.

The welding converter, of annular shape, is located between the welding head body portions.

Operation of the welding head is accomplished in the following way.

The welding head is brought in suspended position by a lifting device over the joint to be welded, the welding head body is opened and the two portions thereof installed on the tubes at opposite sides of the joint to be welded. Under the action of hydraulical cylinders 13 the tubes are clamped by the clamping shoes 8. After switching on the welding converter motor 18 is operated to drive nuts 16. The tubes begin to move towards each other by reason of the threaded engagement of the nuts 16 on the rods 3 and when contact between the ends of the tubes is established the welding current starts flowing and heating of the ends of the tubes under work commences.

After the ends are sufficiently heated, hydraulical cylinders 4 are actuated and the tubes are moved toward each other with sufficient force to complete the weld. The welding head body is then opened and the head is brought by the lifting device to the next joint to be welded.

When welding tubes with a small wall thickness there is danger of crumpling the tube edges by the clamping shoes.

To eliminate this shortcoming a modification of the welding head, as shown in FIGS. 3 and 4, is proposed. In this case the two portions 19 and 20 of the annular body are provided with rigid solid clamping bushings 21 actuated by the vertical hydraulical cylinders 22 the piston rods 23 of which, through levers 24, are connected with the upper ends of the openable annular body portions. Hinge 25 connects the lower ends of the welding head body portions. Bearing rolls 26 are electrically driven and are used to move the welding head along the tube under work to the next joint to be welded.

Operation of this welding head is similar to that described above for the welding head shown in FIGS. 1 and 2, the difference being that the welding head when mounted on a tube is moved to the next joint without removal from the tube and without the use of the lifting device (crane). Solid rigid clamping bushings protect the tube walls from crumbling, as a result of which a high-quality weld joint is ensured.

With a view to increasing the rigidity of the welding head body, to decreasing the overall dimensions and to simplify the design a further modification of the welding head, as shown in FIGS. 5 and 6, is proposed.

In the latter case the unopenable annular body 27 is provided with bearing rolls 28 to move the welding head along the tube under work and the clamping shoes 29 are arranged on the perimeter of the joint under work and are connected to the secondary winding of the welding converter 30.

The drive for displacement of the clamping shoes 29 in a radial direction comprises annular cams 31 having conical inner surfaces interacting with the bevelled bearing surfaces of the clamping shoes 29. Cams 31 are, through annular piston rods 32, connected to annular pistons 33 of the annular hydraulic cylinders 34 which embrace the tube under work. Cams 31 are provided with brackets 35 having holes which receive and are guided along guide bars 36. Annular hydraulic cylinder 37 with annular piston 38 is used for relative axial displacement of the tubes under work. Piston rod 39 of this cylinder is connected to the annular cylinder 34, and in the course of welding, displaces the same along with piston 33, piston rod 32, clamp 31 and tube 6 under work.

Operation of this modified-version welding of the head is carried out in the following way.

The welding head is mounted on the tube under work and, by means of the bearing rolls, is moved to the joint to be welded.

Hydraulic cylinders 34 are actuated and the tubes under work are clamped in the welding head body. Now the welding converter is energized and voltage is supplied to the clamping shoes 29. Hydraulical cylinder 37 is actuated and the tubes under work begin to approach each other. As soon as the edges come into contact welding current starts flowing. Under its effect the tube edges are heated; continued operation of hydraulical cylinder 37 forces the ends of the tubes together and completes the weld. Subsequently the clamping shoes 29 are released from the tubes and the welding head is moved to the next joint to be welded.

The above described welding head ensures a high quality of the weld joint both when carrying out welding in the field and also under shop conditions.

The welding head design is sturdy, ensures good and safe clamping of the tubes and a good weld. Safe operation, long service life and stable results as to the quality of the welded tube joints are also ensured.

What is claimed is:

1. A welding device for electrical contact resistance welding of circular joints of axially aligned tubes, said device comprising a pair of spaced body portions to be received around tubes to be joined adjacent the opposed ends thereof, said body portions being supported solely by said tubes, clamping shoes on each body portion comprising a plurality of circumferentially spaced radially movable members for engaging the associated tube, rolls engaging said members, a pair of semicircular cam rings on each body portion, inclined cam surfaces on said rings engaging said rolls, a hydraulic cylinder on each body portion to rotate said cam rings and actuate said members, means for supplying electric welding current to each tube and means for moving said body portions and tubes toward each other for bringing the opposed ends of said tubes into contact and forcing the same together to complete the weld.

2. A welding device for electrical contact resistance welding of circular joints of axially aligned tubes, said device comprising a pair of spaced body portions to be received around tubes to be joined adjacent the opposed ends thereof, said body portions being supported solely by said tubes, clamping shoes on each body portion for engaging the associated tube, means on each body portion for actuating said shoes, means for supplying electric welding current to each tube and means for moving said body portions and tubes toward each other for bringing the opposed ends of the tubes into contact and forcing the same together to complete the weld, said last-named means comprising a plurality of rods slidably receiving said body portions, one end of each rod being threaded and a piston on the opposite end of each rod, hydraulic cylinders on one body portion receiving said pistons, nuts threadedly received on said rods and engaging the other body portion, intermeshing gear teeth on said nuts and a motor having a drive pinion meshing with the teeth on one nut to simultaneously drive all of the nuts, said body portions and tubes being selectively movable by said nuts or by said hydraulic cylinders.

3. A welding device for electrical contact resistance welding of circular joints of axially aligned tubes, said device comprising a pair of spaced body portions to be received around tubes to be joined adjacent the opposed ends thereof, said body portions being supported solely by said tubes, clamping shoes on each body portion for engaging the associated tube, said shoes comprising semicircular rings hingedly connected at one end, linkage means at the opposite ends and a hydraulic cylinder on each body portion for operating said linkage means to actuate said shoes, means for supplying electric welding current to each tube and means for moving said body portions and tubes toward each other for bringing the opposed ends of the tubes into contact and forcing the same together to complete the weld.

4. A welding device for electrical contact resistance welding of circular joints of axially aligned tubes, said device comprising a pair of spaced body portions to be received around tubes to be joined adjacent the opposed ends thereof, said body portions being supported solely by said tubes, connecting means between said body portions, clamping shoes mounted on said connecting means for engaging the associated tubes, means on one body portion for actuating the adjacent shoe, a second means for actuating the other shoe, means for supplying electric welding current to each tube, an annular hydraulic cylinder fixed with respect to the other body portion and surrounding the associated tube, an annular piston in said cylinder and an annular piston rod connected to said second means, whereby upon actuation of said cylinder said second means and other shoe will move in one direction and said other body portion, said connecting means, said one body portion and said adjacent shoe will move in the opposite direction to move said tubes toward each other for bringing the opposed ends of the tubes into contact and forcing the same together to complete the weld.

References Cited in the file of this patent

UNITED STATES PATENTS

| | | |
|---|---|---|
| 2,344,939 | Bennett | Mar. 28, 1944 |
| 2,777,048 | Kocks | Jan. 8, 1957 |
| 2,919,335 | Shaughnessy | Dec. 29, 1959 |